(12) United States Patent
Sandro et al.

(10) Patent No.: US 7,217,208 B1
(45) Date of Patent: May 15, 2007

(54) FLEXIBLE BICYCLE CHAIN

(76) Inventors: Montanari Sandro, No. 487, Ko-Chung Rd., Ta-Li City, Taichung Hsien (TW); Righi Ermanno, No. 487, Ko-Chung Rd., Ta-Li City, Taichung Hsien (TW)

( * ) Notice: Subject to any disclaimer, the term of this patent is extended or adjusted under 35 U.S.C. 154(b) by 0 days.

(21) Appl. No.: 11/305,290

(22) Filed: Dec. 19, 2005

(51) Int. Cl.
*F16G 13/02* (2006.01)

(52) U.S. Cl. ..................... 474/230; 474/231

(58) Field of Classification Search ............ 474/206, 474/209, 210, 212–215, 228–234
See application file for complete search history.

(56) References Cited

U.S. PATENT DOCUMENTS

| | | | | |
|---|---|---|---|---|
| 1,945,357 A | * | 1/1934 | Pierce | 474/210 |
| 2,277,915 A | * | 3/1942 | Klaucke | 474/210 |
| 2,882,103 A | * | 4/1959 | Johnson et al. | 305/202 |
| 3,135,128 A | * | 6/1964 | Rudolph | 474/207 |
| 6,302,818 B1 | * | 10/2001 | Haight | 474/231 |

* cited by examiner

*Primary Examiner*—Richard Ridley
*Assistant Examiner*—James Pilkington

(57) ABSTRACT

A bicycle chain includes a plurality pairs of outer plates and inner plates. Each pair of the outer plates is connected at two opposite ends to two pairs of the inner plates by connectors connected to the inner plates. Each connector has a rivet extending therethrough and two ends of the rivet are respectively connected to the two opposite ends of the outer plates. Each rivet has a protrusion extending radially outward from the outer periphery thereof and the protrusion is in contact with an inner periphery of a central passage of the connector corresponding thereto. There is a gap defined between the rivet and the inner periphery of the central passage so that the chain has more flexibility.

1 Claim, 8 Drawing Sheets

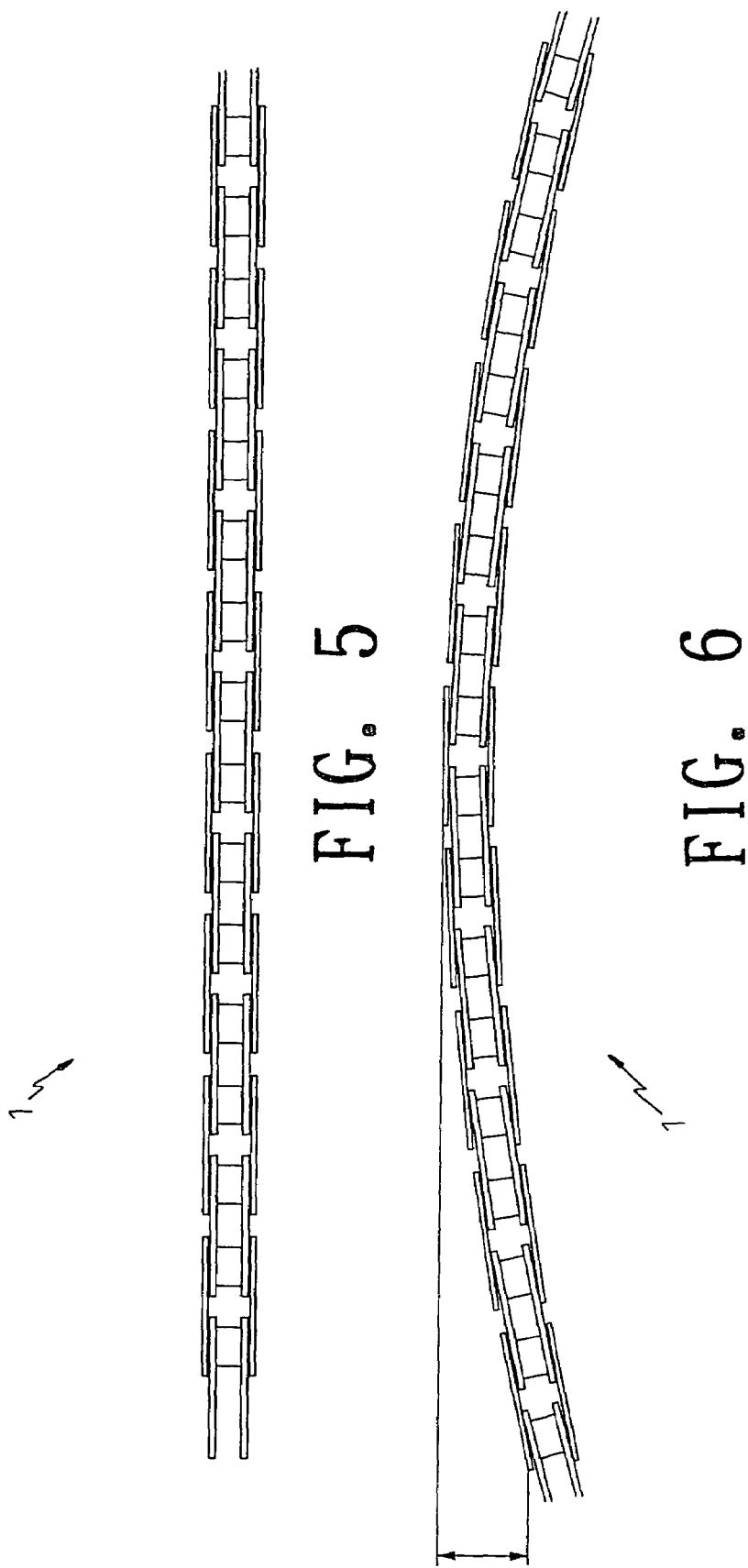

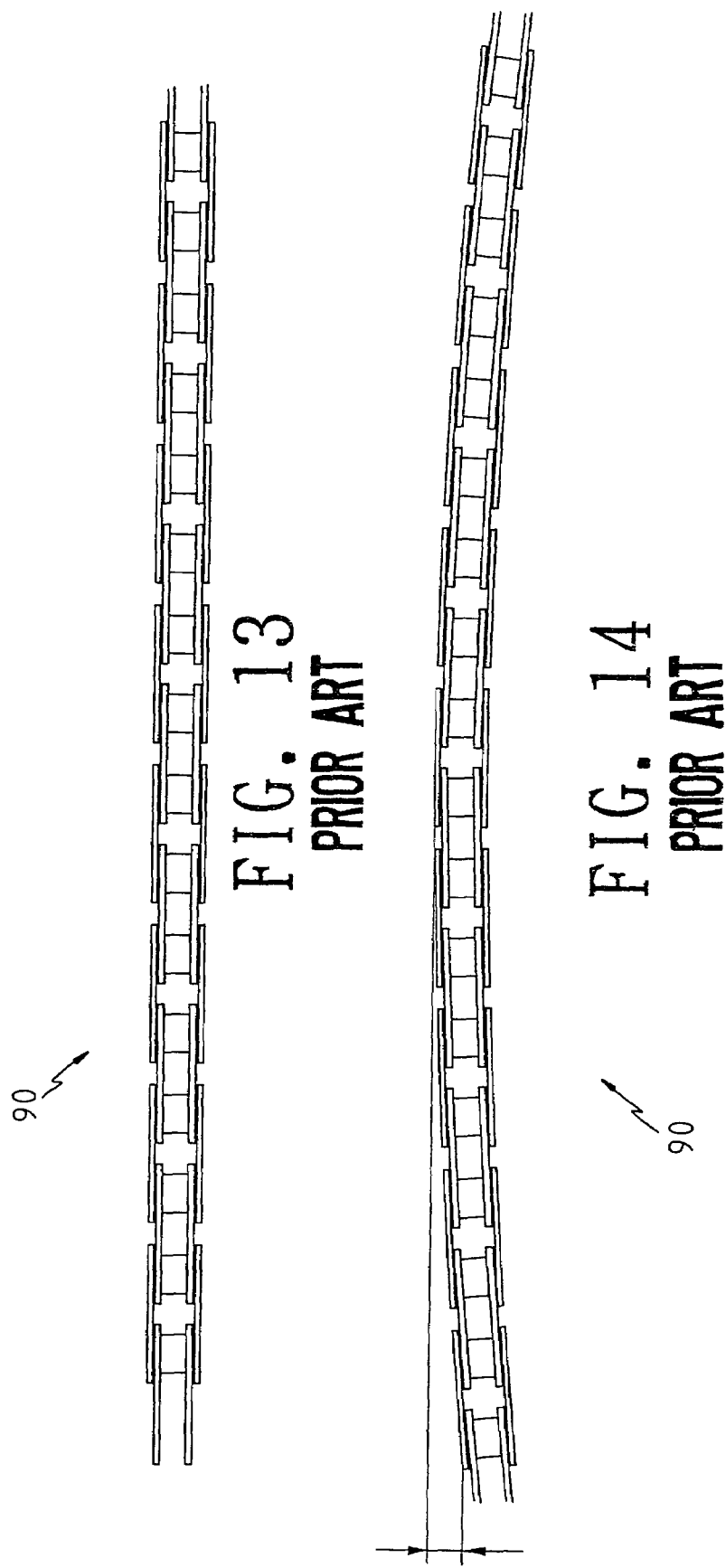

FLEXIBLE BICYCLE CHAIN

FIELD OF THE INVENTION

The present invention relates to a flexible bicycle chain wherein each of the rivets includes a protrusion in contact with an inner periphery of the connector so as to provide gaps between the connectors and the rivets to allow the chain to be flexible.

BACKGROUND OF THE INVENTION

A conventional bicycle chain 90 is shown in FIG. 12 and generally includes a plurality of inner plates 94 and outer plates 93, each of the inner plates 94 has two first holes and each of the outer plates 93 has two second holes. Two connectors 92 are connected between two parallel inner plates 94 and two respective ends of each connector 92 are engaged with the first holes of the two parallel inner plates 94. Two outer plates 93 are located outside of two sets of the inner plates 94 and two ends of the two outer plates 93 are connected to two adjacent ends of the two sets of the inner plates 94 by extending two rivets 92 through the two connectors 92 at the two adjacent ends of the two sets of the inner plates 94. Two ends of each pin 91 are engaged with two respective second holes of the two parallel outer plates 93. By this way, the inner plates 94 and the outer plates 93 are continuously connected to form a loop of the chain 90 as shown in FIG. 13.

However, the conventional chain 90 is stiff and lacks flexibility so that when the chain 90 is shifted from one gear to another, a noise is generated and might not be precisely shifted to desired position. This is because there is no gap defined between the rivets 91 and the connectors 92. On the contrary, if the rivets 91 are made to be smaller than the size of the central hole of the connectors 92, the structural strength will not be strong enough to bear the severe operation of the chain 90.

The present invention intends to provide a chain that has better flexibility while the structural strength is maintained.

SUMMARY OF THE INVENTION

The present invention relates to a flexible bicycle chain which comprises a plurality pairs of inner plates and a plurality pairs of outer plates which are connected to the outer plates by connectors and rivets. Each pair of the inner plates has two first holes defined through a first end and a second end thereof, and each pair of the outer plates has two second holes defined through a first end and a second end thereof. Each pair of the outer plates is connected at the first and second ends thereof to two pairs of the inner plates respectively. The second holes of the first end of each pair of the outer plates are in alignment with the first holes of the first end of one of the pairs of the inner plates. The second holes of the second end of each pair of the outer plates are in alignment with the first holes of the second end of another pair of inner plates. Each pair of the inner plates has two connectors connected to the first holes in the first and second ends thereof, and each connector has a central passage defined axially therethrough. Each connector has a rivet extending therethrough and two ends of each of the connectors are connected with the second holes at each of the first and second ends of each pair of the outer plates. An outer periphery of the rivet is partially in contact with an inner periphery of the central passage of the connector corresponding thereto.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 5 shows a section of the chain of the present invention;

FIG. 6 shows the chain bends laterally;

FIG. 13 shows a section of the conventional chain, and

FIG. 14 shows that conventional chain bends laterally.

DETAILED DESCRIPTION OF THE PREFERRED EMBODIMENT

Figure 1:
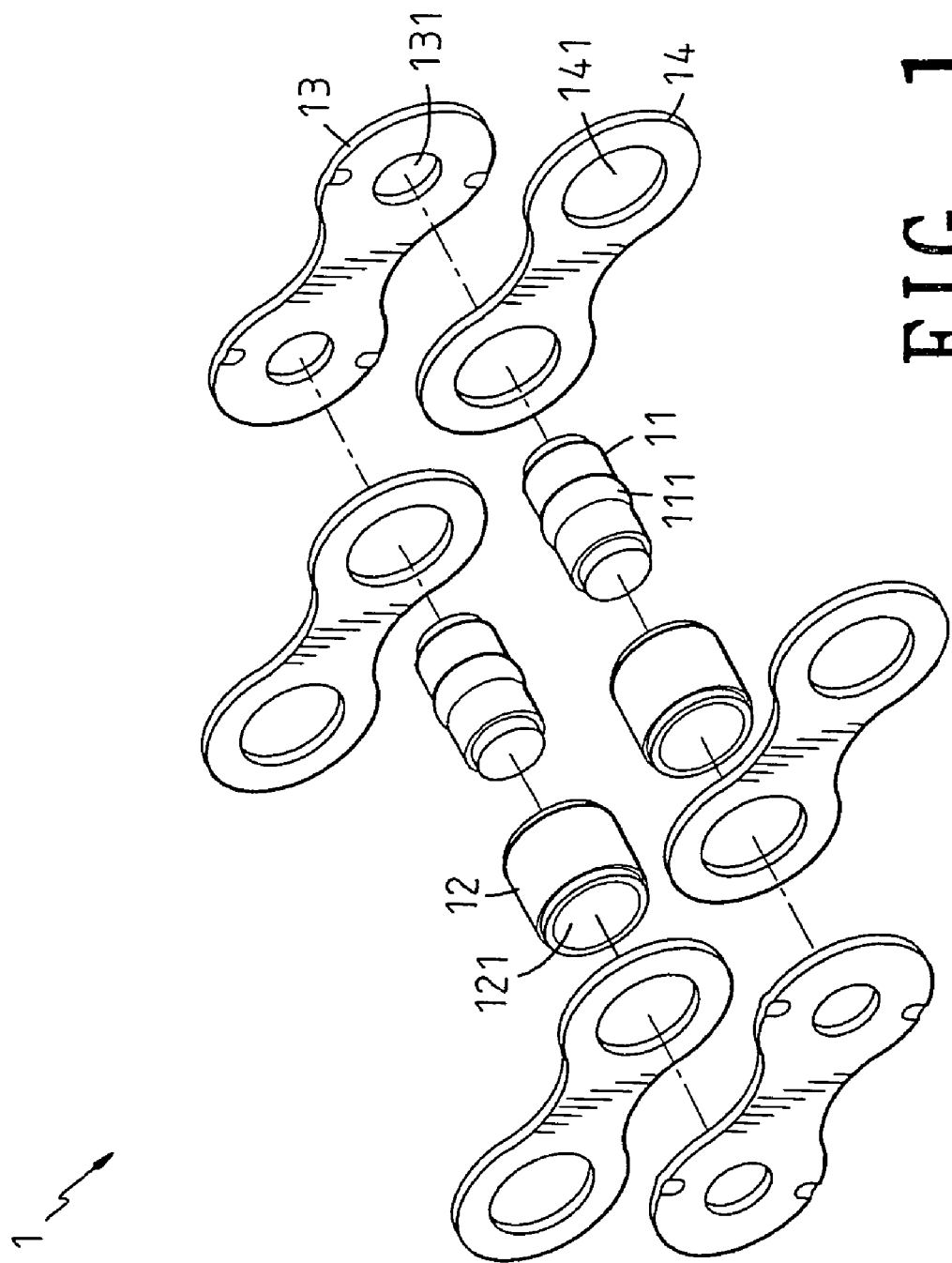
FIG. 1 is an exploded view to show the chain of the present invention.
Figure 2:
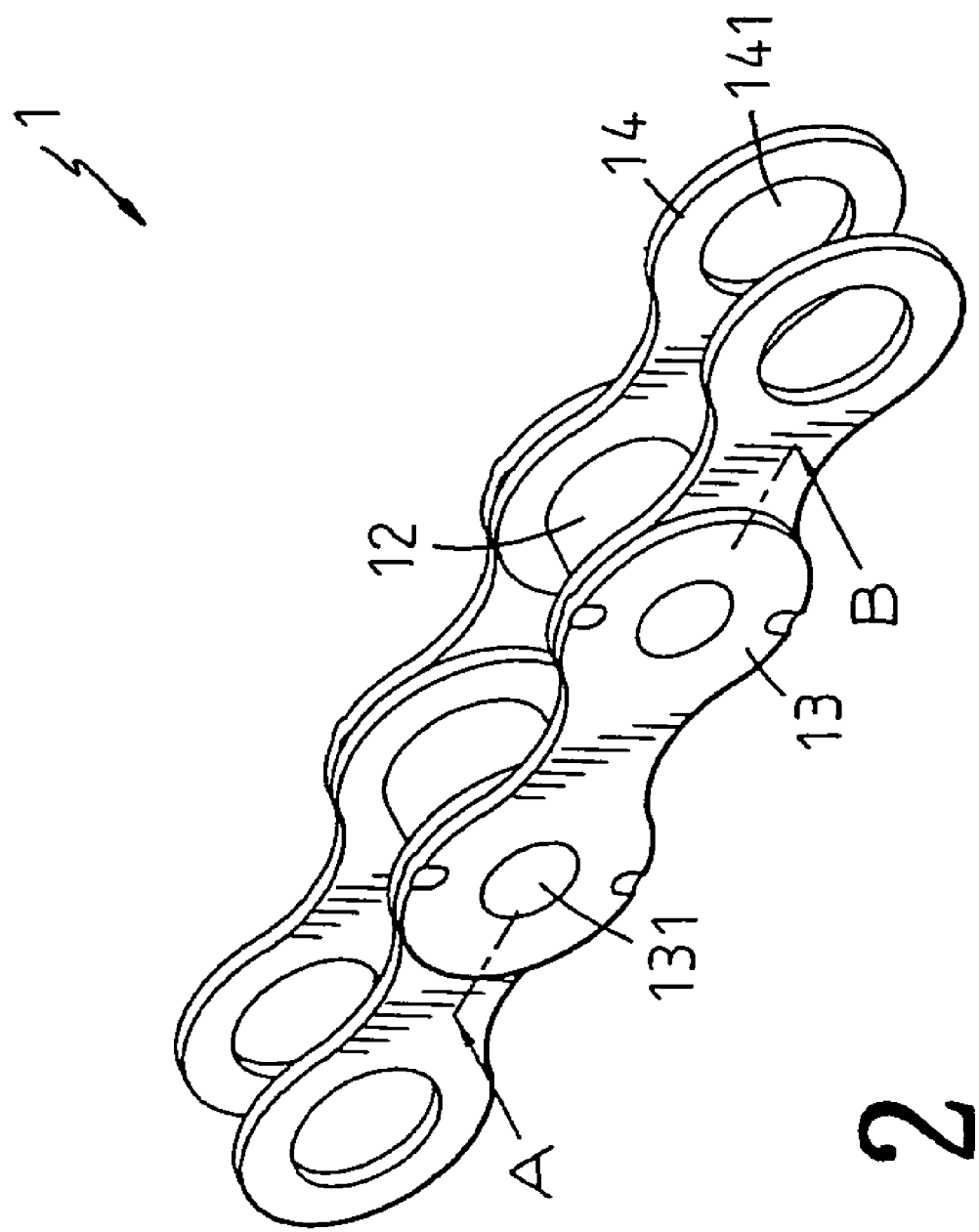
FIG. 2 is a perspective view to show the chain of the present invention.
Figure 3:
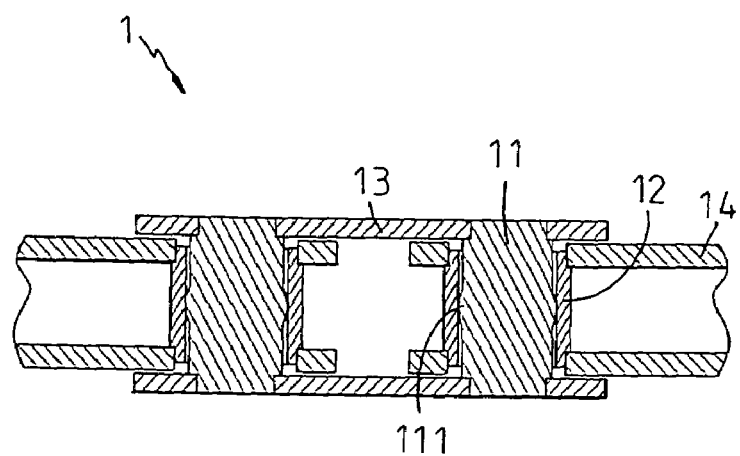
FIG. 3 is a cross sectional view to show the chain of the present invention.
Figure 4:
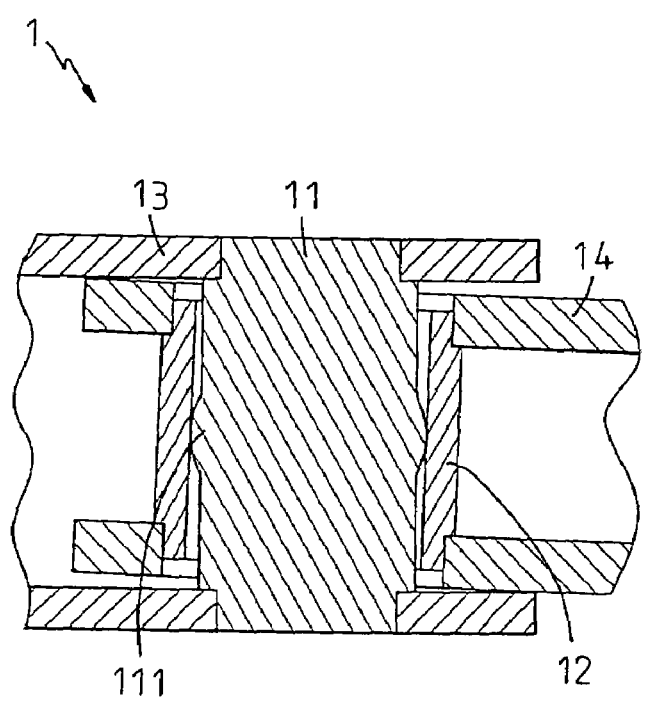
FIG. 4 is a cross sectional view along the line A-B in FIG. 3.

Referring to FIGS. 1 to 5, the bicycle chain 1 of the present invention comprises a plurality pair of inner plates 14 and a plurality pair of outer plates 13 which are connected to the inner plates 14 by connector 12 and rivets 11 to form a loop of the bicycle chain 1. Each pair of the inner plates 14 has two first holes 141 defined through a first and a second end thereof. Each pair of the outer plate 13 has two second holes 131 defined through a first end and a second end thereof.

Each pair of the outer plates 13 is connected at the first and second ends thereof to two pairs of the inner plates 14 respectively. The second holes 131 of the first end of each pair of the outer plates 13 are in alignment with the first holes 141 of the first end of one of the pairs inner plates 14, and the second holes 131 of the second end of each pair of the outer plates 13 are in alignment with the first holes 141 of the second end of another pair of inner plates 14.

Two connectors 12 are connected to the first holes 141 in the first and second ends of each pair of the inner plates 14, and each connector 12 has a central passage 121 defined axially therethrough. Each connector 12 has a rivet 11 extending therethrough and two ends of each of the connectors 12 are connected with the second holes 131 at each of the first and second ends of each pair of the outer plates 13.

An outer periphery of the rivet 11 is partially in contact with an inner periphery of the central passage 121 of the connector 12 corresponding thereto so that there is a gap defined between the rivet 11 and the inner periphery of the central passage 121. The gap allows the connectors 12 to be pivotable about the rivets 11 so that the chain 1 has more flexibility and can bend laterally at larger angle as shown in FIG. 6.

The first embodiment of the rivet 11 shows that the rivet 11 has a protrusion 111 extending radially outward from the outer periphery thereof and the protrusion 111 is in contact with the inner periphery of the central passage 121 of the connector 12 corresponding thereto.

Figure 7:
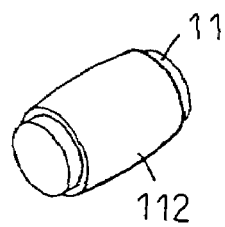
FIG. 7 shows another embodiment of the rivet used in the chain of the present invention.
Figure 8:
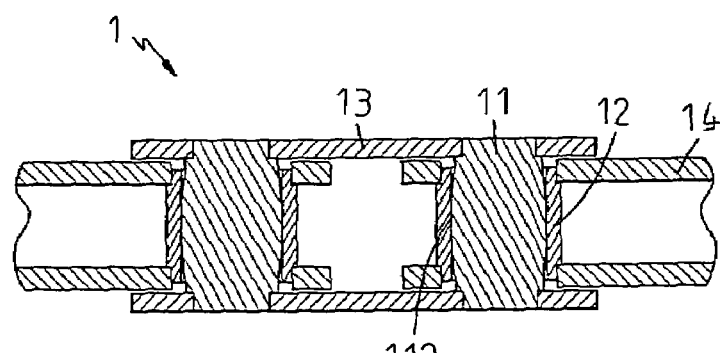
FIG. 8 is a cross sectional view to show that the rivets in FIG. 7 are partially in contact with the connectors.
Figure 9:
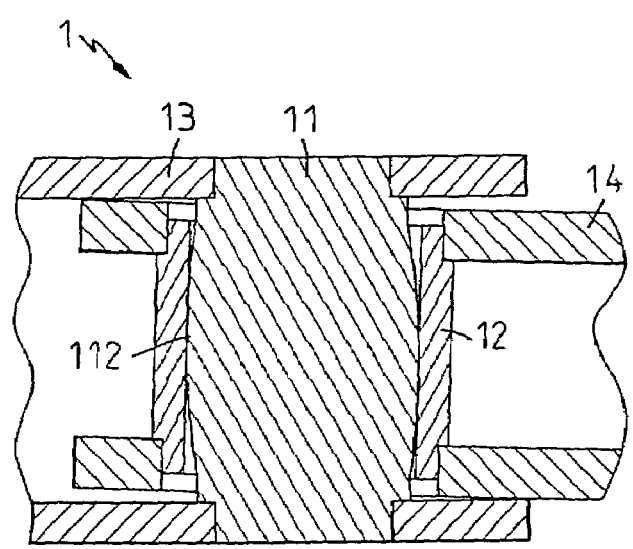
FIG. 9 is an enlarged cross sectional view to show the rivet in FIG. 7 and the connector.

As shown in FIGS. 7 to 9, the second embodiment of the rivet 11 shows that the rivet 11 has a protrusion extending radially outward from the outer periphery thereof and the protrusion has a curved outer surface 112. A part of the curve outer surface 112 is in contact with the inner periphery of the central passage 121 of the connector 12 corresponding thereto.

Figure 10:
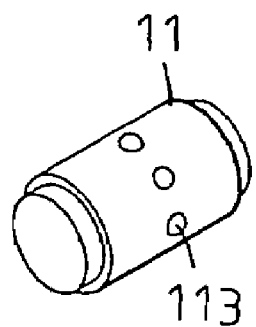
FIG. 10 shows yet another embodiment of the rivet used in the chain of the present invention.
Figure 11:
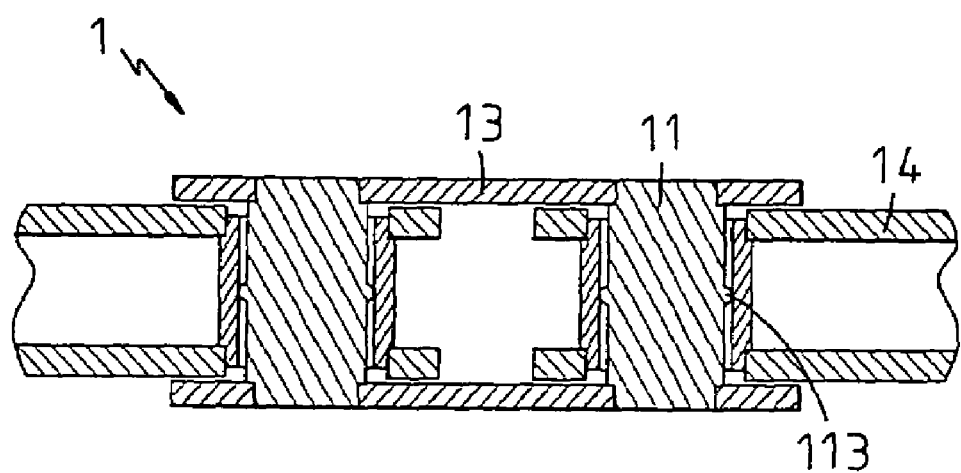
FIG. 11 is a cross sectional view to show that the rivets in FIG. 10 are partially in contact with the connectors.
Figure 12:
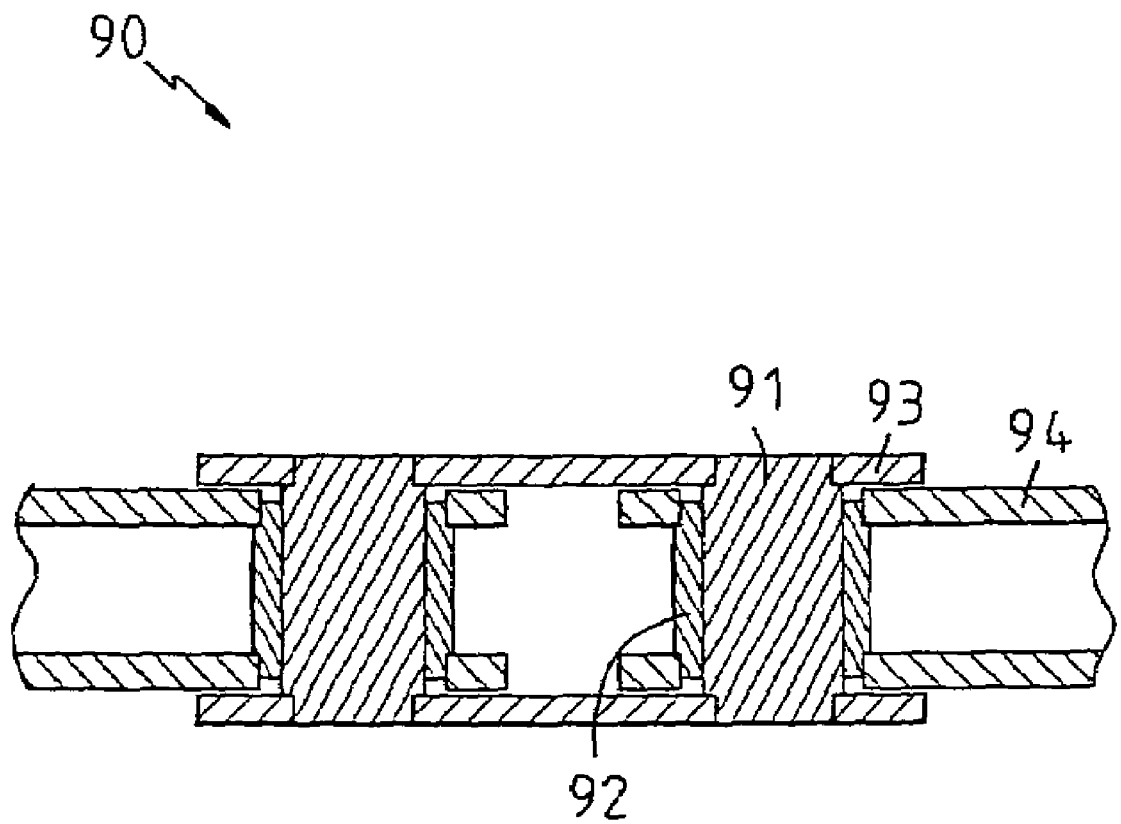
FIG. 12 is a cross sectional view to show a conventional chain.

As shown in FIGS. 10 and 11, the third embodiment of the rivet 11 shows that the rivet 11 has a protrusion extending radially outward from the outer periphery thereof and the protrusion includes a plurality of bosses 113 which are in contact with the inner periphery of the central passage 121 of the connector 12 corresponding thereto.

While we have shown and described the embodiment in accordance with the present invention, it should be clear to those skilled in the art that further embodiments may be made without departing from the scope of the present invention.

What is claimed is:

1. A bicycle chain comprising:

a plurality of inner plate pairs and each pair of the inner plates having two first holes defined through a first end and a second end thereof;

a plurality of outer plate pairs and each pair of the outer plates having two second holes defined through a first end and a second end thereof; each pair of the outer plates connected at the first and second ends thereof to two pairs of the inner plates respectively; the second holes of the first end of each pair of the outer plates being in alignment with the first holes of the first end of one of the pairs of the inner plates, the second holes of the second end of each pair of the outer plates being in alignment with the first holes of the second end of another pair of the inner plates;

each pair of the inner plates having two connectors connected to the first holes in the first and second ends thereof; each connector having a central passage defined axially therethrough, and each connector having a rivet extending therethrough and two ends of each of the rivets connected with the second holes at each of the first and second ends of each pair of the outer plates;

wherein each rivet has a protrusion extending radially outward from the outer periphery thereof and the protrusion is in contact with the inner periphery of the central passage of the connector corresponding thereto; and wherein the protrusion includes a plurality of bosses which are in contact with the inner periphery of the central passage of the connector corresponding thereto.

* * * * *